(12) United States Patent
Yairi et al.

(10) Patent No.: US 8,751,855 B2
(45) Date of Patent: *Jun. 10, 2014

(54) METHOD AND MEMORY DEVICE FOR GENERATING A TIME ESTIMATE

(71) Applicants: Rahav Yairi, Oranit (IL); Itzhak Pomerantz, Kefar Sava (IL); Itai Dror, Omer (IL); Ori Stern, Modeen (IL)

(72) Inventors: Rahav Yairi, Oranit (IL); Itzhak Pomerantz, Kefar Sava (IL); Itai Dror, Omer (IL); Ori Stern, Modeen (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,978

(22) Filed: Apr. 15, 2013

(65) Prior Publication Data

US 2013/0232308 A1 Sep. 5, 2013

Related U.S. Application Data

(63) Continuation of application No. 12/542,254, filed on Aug. 17, 2009, now Pat. No. 8,448,009.

(51) Int. Cl.
*G06F 21/00* (2013.01)

(52) U.S. Cl.
USPC ................................ 713/502; 726/22; 726/27

(58) Field of Classification Search
USPC .................................... 713/178, 502; 718/102
See application file for complete search history.

(56) References Cited

U.S. PATENT DOCUMENTS

| | | | |
|---|---|---|---|
| 5,444,780 | A | 8/1995 | Hartman, Jr. |
| 5,881,022 | A | 3/1999 | Morganstein |
| 5,892,900 | A | 4/1999 | Ginter et al. |
| 6,367,013 | B1 | 4/2002 | Bisbee et al. |

(Continued)

FOREIGN PATENT DOCUMENTS

| | | |
|---|---|---|
| CN | 1540657 | 10/2004 |
| DE | 102005050352 A1 | 4/2007 |

(Continued)

OTHER PUBLICATIONS

International Search Report and Written Opinion for PCT Application Serial No. PCT/US08/065967, dated Nov. 12, 2008, 10 pages.

(Continued)

*Primary Examiner* — Jung Kim
*Assistant Examiner* — Tri Tran
(74) *Attorney, Agent, or Firm* — Brinks Gilson & Lione

(57) ABSTRACT

A method and memory device for generating a time estimate are provided. In one embodiment, a memory device generates a time estimate from time stamps in file system metadata for a plurality of files stored in the memory device and uses the time estimate to perform a time-based activity in the memory device. In another embodiment, a memory device generates a time estimate from time stamps stored in a plurality of files stored in the memory device and uses the time estimate to perform a time-based activity in the memory device. In yet another embodiment, a memory device obtains a plurality of time stamps, selects one or more of the plurality of time stamps based on validity rankings, generates a time estimate from the selected time stamp(s), and uses the time estimate to perform a time-based activity in the memory device.

56 Claims, 4 Drawing Sheets

(56) References Cited

U.S. PATENT DOCUMENTS

| | | |
|---|---|---|
| 6,543,686 B1 | 4/2003 | Ritter |
| 6,556,512 B1 | 4/2003 | Winkler |
| 6,557,102 B1 | 4/2003 | Wong et al. |
| 6,728,466 B1 | 4/2004 | Tanaka |
| 6,728,880 B1 | 4/2004 | Sites |
| 7,194,092 B1 | 3/2007 | England et al. |
| 7,219,234 B1 | 5/2007 | Ashland et al. |
| 7,228,437 B2 | 6/2007 | Spagna et al. |
| 7,536,609 B2 | 5/2009 | Nakamura et al. |
| 7,590,600 B2 | 9/2009 | Bovee et al. |
| 7,793,135 B2 | 9/2010 | Dinescu |
| 7,831,644 B2 | 11/2010 | Moritani et al. |
| 7,831,795 B2 | 11/2010 | Prahlad et al. |
| 7,891,009 B2 | 2/2011 | Jennings et al. |
| 8,224,752 B2 | 7/2012 | Read et al. |
| 2002/0013772 A1 | 1/2002 | Peinado |
| 2002/0120465 A1 | 8/2002 | Mori et al. |
| 2002/0169974 A1 | 11/2002 | McKune |
| 2002/0194010 A1 | 12/2002 | Bergler et al. |
| 2003/0069854 A1 | 4/2003 | Hsu et al. |
| 2003/0115469 A1 | 6/2003 | Shippy et al. |
| 2004/0199578 A1 | 10/2004 | Kapczynski et al. |
| 2004/0215909 A1 | 10/2004 | Imai et al. |
| 2005/0038757 A1 | 2/2005 | Wada |
| 2005/0100113 A1 | 5/2005 | Corts et al. |
| 2005/0181761 A1 | 8/2005 | Park |
| 2005/0187943 A1 | 8/2005 | Finke-Anlauff et al. |
| 2006/0107042 A1 | 5/2006 | Kohmoto |
| 2006/0218404 A1 | 9/2006 | Ogura |
| 2006/0242068 A1 | 10/2006 | Jogand-Coulomb et al. |
| 2006/0248596 A1 | 11/2006 | Jain et al. |
| 2006/0282696 A1 | 12/2006 | Inagaki |
| 2006/0294593 A1 | 12/2006 | Eldar et al. |
| 2007/0043667 A1 | 2/2007 | Qawami et al. |
| 2007/0056042 A1 | 3/2007 | Qawami et al. |
| 2007/0083763 A1 | 4/2007 | Itoh et al. |
| 2007/0110074 A1 | 5/2007 | Bradley et al. |
| 2007/0118608 A1 | 5/2007 | Egli |
| 2007/0197197 A1 | 8/2007 | Minear |
| 2007/0266256 A1 | 11/2007 | Shah et al. |
| 2008/0010450 A1 | 1/2008 | Holtzman et al. |
| 2008/0086423 A1 | 4/2008 | Waites |
| 2008/0270308 A1 | 10/2008 | Peterka et al. |
| 2008/0304364 A1 | 12/2008 | Holtzman et al. |
| 2008/0306710 A1* | 12/2008 | Holtzman et al. ............ 702/178 |
| 2008/0307158 A1 | 12/2008 | Sinclair |
| 2008/0307237 A1 | 12/2008 | Holtzman et al. |
| 2008/0307494 A1 | 12/2008 | Holtzman et al. |
| 2008/0307495 A1 | 12/2008 | Holtzman et al. |
| 2008/0307507 A1 | 12/2008 | Conley et al. |
| 2008/0307508 A1 | 12/2008 | Conley et al. |
| 2009/0113536 A1 | 4/2009 | Zhang et al. |
| 2009/0133116 A1 | 5/2009 | Waisbard et al. |
| 2009/0287942 A1* | 11/2009 | Betouin et al. ............ 713/194 |
| 2010/0024000 A1 | 1/2010 | Holtzman et al. |

FOREIGN PATENT DOCUMENTS

| | | |
|---|---|---|
| EP | 0 586 256 B1 | 3/1994 |
| EP | 1 081 577 | 3/2001 |
| EP | 1 094 374 | 4/2001 |
| GB | 2 316 517 A | 2/1998 |
| JP | H07-036559 | 2/1995 |
| JP | 2001-505341 | 4/2001 |
| JP | 2001-159690 | 6/2001 |
| JP | 2003-296278 | 10/2003 |
| JP | 2004-003928 | 1/2004 |
| JP | 2004-021341 | 1/2004 |
| JP | 2004-038247 | 2/2004 |
| JP | 2004-056793 | 2/2004 |
| JP | 2004-171544 | 6/2004 |
| JP | 2004-320510 | 11/2004 |
| JP | 2004-326278 | 11/2004 |
| JP | 2005-063079 | 3/2005 |
| JP | 2005-165963 | 6/2005 |
| JP | 2005-250613 | 9/2005 |
| JP | 2005-301333 | 10/2005 |
| JP | 2005-331461 | 12/2005 |
| JP | 2006-338583 | 12/2006 |
| JP | 2006/350496 | 12/2006 |
| JP | 2007-157135 | 6/2007 |
| WO | WO 2004/075525 | 9/2004 |
| WO | WO 2006/018864 | 2/2006 |
| WO | WO 2006/069194 | 6/2006 |
| WO | WO 2007/030760 | 3/2007 |
| WO | WO 2007/148319 A | 12/2007 |

OTHER PUBLICATIONS

International Search Report and Written Opinion for PCT Application Serial No. PCT/US08/065968, dated Aug. 29, 2008, 12 pages.

International Search Report and Written Opinion for PCT Application Serial No. PCT/US08/065970, dated Aug. 29, 2008, 12 pages.

International Search Report and Written Opinion for PCT Application Serial No. PCT/US08/065965, dated Jun. 15, 2009, 14 pages.

Hardware White Paper, "Microsoft Extensible Firmware Initiative FAT32 File System Specification", Version 1.03, Dec. 2000, 34 pages.

U.S. Appl. No. 11/811,354 entitled, "Method for Improving Accuracy of a Time Estimate Used in Digital Rights Management (DRM) License Validation", filed Jun. 8, 2007.

Office Action for U.S. Appl. No. 11/811,284, dated Sep. 17, 2009, 47 pages.

Pisello et al., "How to Quantify Downtime", Network World, Jan. 5, 2004, pp. 1-4.

Office Action for U.S. Appl. No. 11/811,284, dated May 7, 2010, 108 pages.

Office Action for U.S. Appl. No. 11/811,289, dated Jun. 30, 2010, 20 pages.

Office Action for U.S. Appl. No. 11/811,344, dated Jun. 10, 2010, 7 pages.

Office Action for U.S. Appl. No. 11/811,345, dated Jun. 10, 2010, 12 pages.

Office Action for U.S. Appl. No. 11/811,354, dated Jul. 20, 2010, 12 pages.

Mills, "Network Time Protocol (Version 3) Specification, Implementation and Analysis", *Network Working Group*, Mar. 1992, 120 pages.

"Standard Deviation and Variance", *QuickMBA*, Sep. 19, 2002, 2 pages.

European Examination Report for European Patent Application Serial No. 08 756 739.2 dated Aug. 23, 2010, 4 pages.

European Examination Report for European Patent Application Serial No. 08 770 229.6 dated Aug. 23, 2010, 5 pages.

European Examination Report for European Patent Application Serial No. 08 780 764.0 dated Aug. 23, 2010, 4 pages.

Office Action for U.S. Appl. No. 11/811,346, dated Aug. 16, 2010, 17 pages.

Office Action for U.S. Appl. No. 11/811,348, dated Aug. 13, 2010, 11 pages.

Office Action for U.S. Appl. No. 11/811,289, dated Jan. 18, 2011, 22 pages.

Office Action for U.S. Appl. No. 11/811,346, dated Feb. 1, 2011, 25 pages.

Office Action for U.S. Appl. No. 11/811,354, dated Feb. 23, 2011, 13 pages.

Office Action for U.S. Appl. No. 11/811,284, dated Apr. 14, 2011, 15 pages.

Office Action for U.S. Appl. No. 11/811,347, dated Mar. 24, 2011, 32 pages.

Office Action for U.S. Appl. No. 11/811,346, dated Jul. 20, 2011, 25 pages.

Translation of Office Action for Chinese Patent Application Serial No. 200880019347.3, dated May 25, 2011, 5 pages.

Office Action for U.S. Appl. No. 11/811,289, dated Oct. 13, 2011, 23 pages.

Office Action for U.S. Appl. No. 11/811,284, dated Oct. 17, 2011.

Office Action for Chinese Patent Application Serial No. 2008801024434.4, dated Oct. 17, 2011, 13 pages.

(56) References Cited

OTHER PUBLICATIONS

Office Action for Chinese Patent Application Serial No. 2008801012320.0, dated Nov. 3, 2011, 11 pages.
Office Action for Chinese Patent Application Serial No. 200880123179, dated Dec. 21, 2011, 13 pages.
Office Action for U.S. Appl. No. 12/542,254, dated Mar. 1, 2012, 23 pages.
Office Action for U.S. Appl. No. 11/811,289, dated Mar. 2, 2012, 25 pages.
Notification of Reasons for Refusal for Japanese Application Serial No. 2010-511336, dated Feb. 28, 2012, 4 pages.
Office Action for U.S. Appl. No. 11/811,284, dated Jul. 3, 2012, 17 pages.
Office Action for U.S. Appl. No. 12/542,254, dated Jul. 10, 2012, 25 pages.
Office Action for Chinese Patent Application Serial No. 008800193473, dated Apr. 28, 2012, 5 pages.
Office Action for Japanese Patent Application Serial No. 2010-511333, dated May 8, 2012, 9 pages.
Office Action for Japanese Patent Application Serial No. 2010-511335, dated May 8, 2012, 6 pages.
Office Action for Taiwanese Patent Application Serial No. 097121272, dated May 11, 2012, 10 pages.
Notification for Reasons for Refusal for Japanese Patent Application Serial No. 2010-511333, dated Aug. 21, 2012, 5 pages.
Notification for Reasons for Refusal for Japanese Patent Application Serial No. 2010-511335, dated Aug. 21, 2012, 4 pages.
Office Action for Chinese Patent Application Serial No. 2008801024434 dated Aug. 2, 2012, 18 pages.
Office Action for Chinese Patent Application Serial No. 2008801002317.9, dated Sep. 25, 2012, 5 pages.
Office Action for Chinese Patent Application Serial No. 2008801023200, dated Sep. 21, 2012, 13 pages.
Office Action for Taiwanese Patent Application Serial No. 097121254, dated Aug. 13, 2012, 10 pages.
Notification of Reasons for Refusal for Japanese Patent Application Serial No. 2010-511334, dated Nov. 6, 2012, 8 pages.
Office Action for U.S. Appl. No. 11/811,284, dated Dec. 17, 2012, 17 pages.
Decision for Refusal for Japanese Patent Application Serial No. 2010-511336, dated Dec. 11, 2012, 4 pages.
Office Action for U.S. Appl. No. 11/811,289, dated Feb. 21, 2013, 47 pages.
Notice of Allowance for U.S. Appl. No. 12/542,254, dated Mar. 4, 2013, 19 pages.
Office Action for Taiwanese Patent Application Serial No. 097121262, dated Jan. 21, 2013, 6 pages.
Office Action for Taiwanese Patent Application Serial No. 097121269, dated Feb. 4, 2013, 4 pages.
Office Action for Chinese Patent Application Serial No. 2008801023200, dated Apr. 15, 2013, 9 pages.
Office Action for Chinese Patent Application Serial No. 2008801024434, dated Feb. 18, 2013, 4 pages.
Office Action for European Patent Application Serial No. 08 756 739.2, dated Mar. 18, 2013, 4 pages.
Office Action for European Patent Application Serial No. 08 770 229.6, dated Mar. 18, 2013, 7 pages.
Office Action for European Patent Application Serial No. 08 780 764.0, dated Mar. 18, 2013, 7 pages.

\* cited by examiner

METHOD AND MEMORY DEVICE FOR GENERATING A TIME ESTIMATE

CROSS-REFERENCE TO RELATED APPLICATION

This application is a continuation of U.S. patent application Ser. No. 12/542,254, filed Aug. 17, 2009, which is hereby incorporated by reference.

BACKGROUND

It is sometimes desired for a memory device, such as a memory card, to perform a time-based activity, such as, but not limited to, determining whether a digital rights management (DRM) license has expired. Many memory devices do not have a battery and, thus, are unable to run an internal real-time clock to keep track of time. Some memory devices rely upon a software agent running in a host device to provide the memory device with a time stamp. In operation, the software agent running in the host device would obtain a time stamp from an external time source (such as a time server in a network) and send the signed time stamp to the memory device. Since the software agent obtains the time stamp from an external time source, the memory device will not be able to receive a time stamp from the external time source when the host device is not able to connect to the external time source (e.g., when the host device is not connected to the Internet or loses its wireless connection) or if the host is not running the agent (e.g., if the agent is not supported by the host platform, if the agent was terminated, etc.). In such a situation, the memory device can perform a time-based activity using a previously-received time stamp. However, performing the time-based activity with a stale time stamp may lead to an inefficient or unintended result (e.g., allowing access to content based on the stale time stamp even though the content license is actually expired).

SUMMARY

Embodiments of the present invention are defined by the claims, and nothing in this section should be taken as a limitation on those claims.

By way of introduction, the embodiments described below generally relate to a method and memory device for generating a time estimate. In one embodiment, a memory device generates a time estimate from time stamps in file system metadata for a plurality of files stored in the memory device and uses the time estimate to perform a time-based activity in the memory device. In another embodiment, a memory device generates a time estimate from time stamps stored in a plurality of files stored in the memory device and uses the time estimate to perform a time-based activity in the memory device. In yet another embodiment, a memory device obtains a plurality of time stamps, selects one ore more of the plurality of time stamps based on validity rankings, generates a time estimate from the selected time stamp(s), and uses the time estimate to perform a time-based activity in the memory device.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Figure 1:
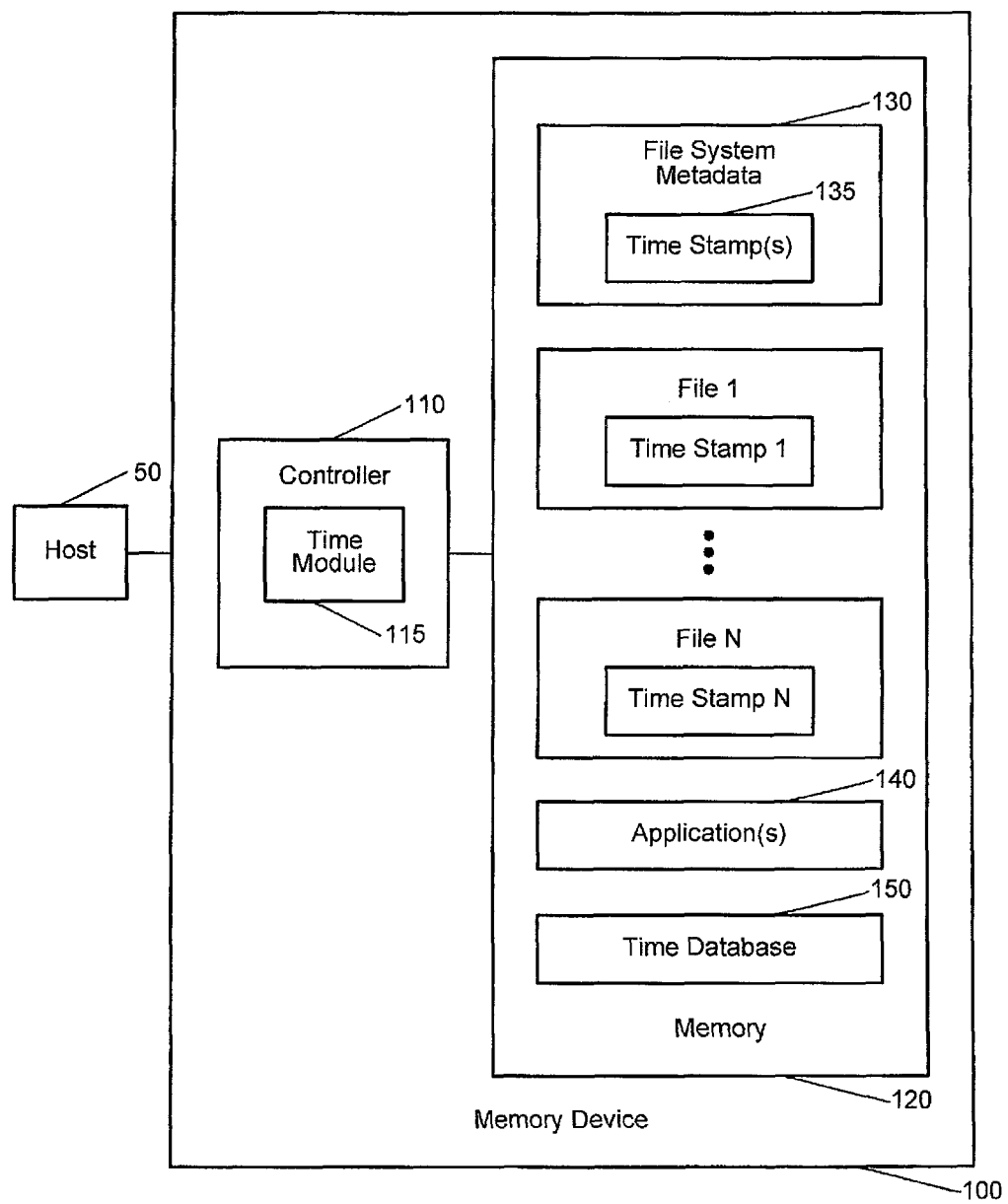
FIG. 1 is a block diagram of a host and a memory device of an embodiment.

The following embodiments provide a method and memory device for generating a time estimate. These embodiments allow a memory device to more accurately perform a time-based activity when the memory device is not able to receive a time stamp from an external source. Turning now to the drawings, FIG. 1 is a block diagram of a host 50 in communication with a memory device 100 of an embodiment. As used herein, the phrase "in communication with" could mean directly in communication with or indirectly in communication with through one or more components, which may or may not be shown or described herein. The host 50 can take any suitable form, such as, but not limited to, a dedicated content player, a mobile phone, a personal computer, a game device, a personal digital assistant (PDA), a kiosk, a set-top box, and a TV system. The memory device 100 can also take any suitable form, such as, but not limited to, a handheld, removable memory card (such as an SD or microSD card), a handheld universal serial bus ("USB") flash drive ("UFD"), an embedded memory device, and a removable or non-removable hard drive (such as a solid-state drive).

Figures 4, 5:
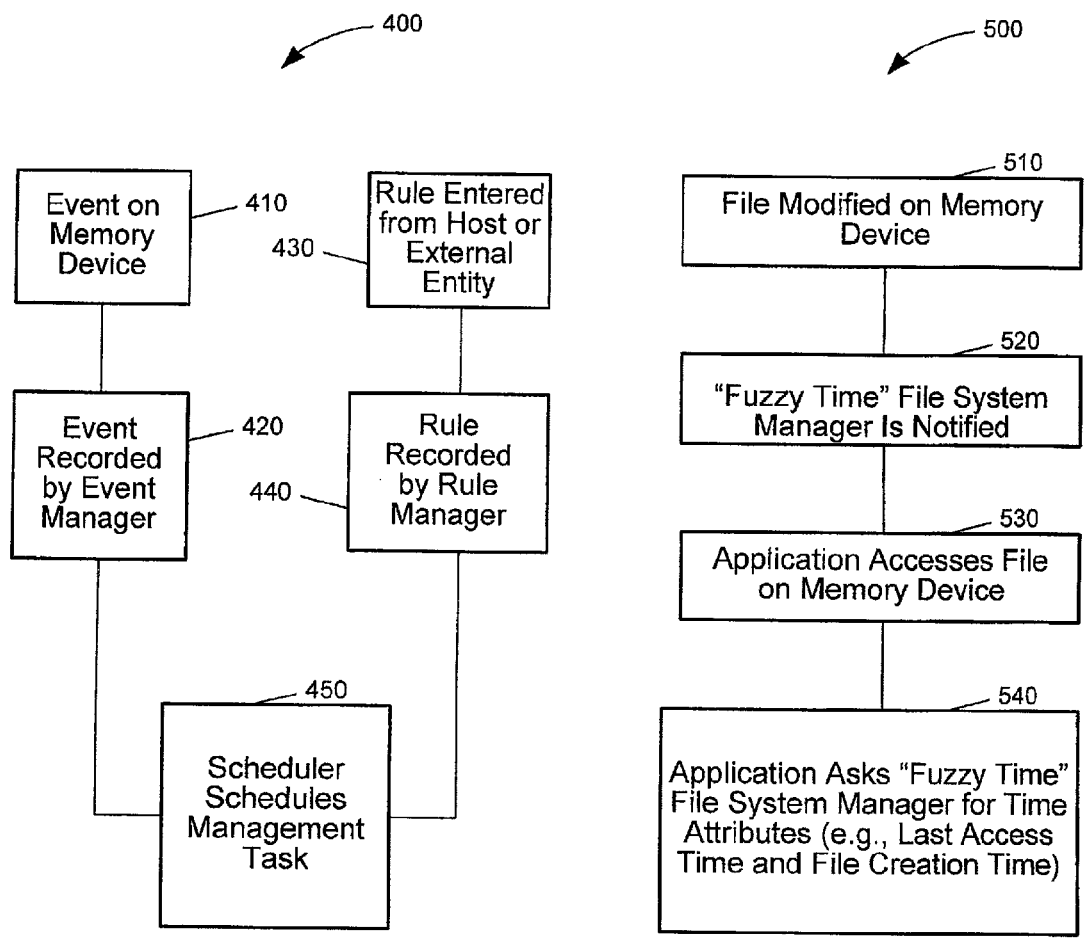
FIG. 4 is a flow chart illustrating a management task scheduling operation of an embodiment.
FIG. 5 is a flow chart illustrating a method of an embodiment for applying a time estimate.

As shown in FIG. 1, the memory device 100 in this embodiment comprises a controller 110 and a memory 120. In general, the controller 110 controls various functions of the memory device 100. In this embodiment, the controller 110 comprises a time module 115, which can be implemented with hardware and/or software and will be described in more detail below. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91 SAM, Microchip PIC18F26K20, and Silicon Labs C8051F320. Examples of various components and functions that can be used in a controller are described in the embodiments discussed herein and are shown in the associated drawings. For example, in one embodiment, the controller 110 is operative to execute firmware to perform the acts shown in FIGS. 2, 4, and 5.

In addition to the controller 110, the memory device 100 comprises a memory 120. The memory 120 can take any suitable form. In one embodiment, the memory 120 takes the form of a solid-state (e.g., flash) memory and can be one-time programmable, few-time programmable, or many-time programmable. However, other forms of memory can be used. In this embodiment, the memory 120 stores a plurality of files (files 1-N) in its file system, along with file system metadata 130 for those files. As used herein, a "file" can take any suitable form and contain any suitable content, such as, but not limited to, digital video (with or without accompanying audio) (e.g., a movie, an episode of a TV show, a news program, etc.), digital audio (e.g., a song, a podcast, one or a series of sounds, an audio book, etc.), still or moving images (e.g., a photograph, a computer-generated display, etc.), text (with or without graphics) (e.g., an article, a text file, etc.), a video game, and a hybrid multi-media presentation of two or more of these forms. As also used herein, "file system metadata" refers to data about the files stored in the memory device's file system. As shown in FIG. 1, file system metadata 130 can include time stamps 135 related to files 1-N. For example, the file system metadata 130 for a given file can take the form of an entry in a file allocation table, and the time stamp 135 can be one or more of a file creation time, a last access time, and a last modification time. In addition to a time stamp 135, the file system metadata 130 can contain other data, such as, but not limited to, file name, file size, and data type. Additionally, the memory 110 can store one or more applications 140, as well as a time database 150, which will be described in more detail below.

It may be desired for the memory device 100 to perform a time-based activity. When, as in this embodiment, the memory device 100 does not have a real-time clock to keep track of time, a software agent running on the host 50 may be able to provide the memory device 100 with a time stamp with which the memory device 100 can perform the time-based activity. However, if the host 50 is not equipped to service time queries from the memory device or is not trusted or cannot make a connection to a trusted time source, a reliable time stamp may not be available from the host 50. To address this concern, the memory device 100 in this embodiment comprises a time module 115 that is operative to generate a time estimate from time stamps and possibly other information already contained in the memory device 100 (and, optionally, with the assistance of time information received from outside of the memory device 100, as will be discussed below). The time module 115 can generate a time estimate from one or more time stamps, and if multiple time stamps are used, the time module 115 can assess the multiple sources using a ranking system. It should be noted that a time stamp and a time estimate can take any suitable format (e.g., time and date, date only, etc.) and any suitable level of granularity (e.g., days, hours, minutes, seconds, etc.). Further, the format for a time stamp can be the same as or different from the format used for a time estimate. For example, a time stamp may have a day/month/year/hour/minutes/second format, and a time estimate may only have a day/month/year format. Additionally, a time stamp and/or a time estimate may be a time interval (e.g., between 1/1/09 and 6/1/09) instead of an exact time (e.g., 4/20/09 at 09:23:17).

Figure 2:
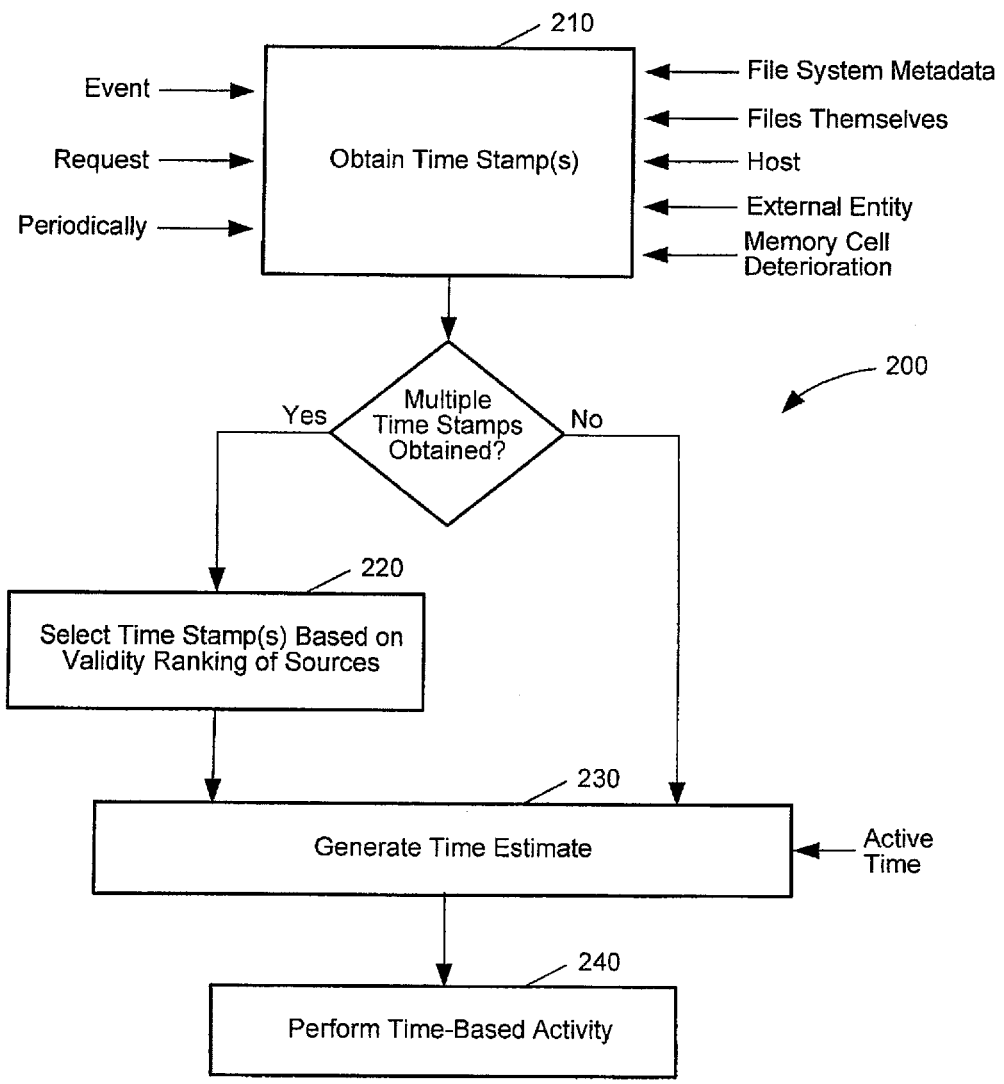
FIG. 2 is a flow chart of a method of an embodiment for generating a time estimate.

FIG. 2 is a flow chart 200 of a method that can be implemented by the time module 115 in the controller 100. As shown in FIG. 2, the time module 115 first obtains one or more time stamps (act 210). The time stamp(s) can be obtained at any suitable time. For example, as indicated in FIG. 2, the time module 115 can capture the time stamps 135 upon an occurrence of an event (e.g., whenever file system metadata 130 is updated), upon request (e.g., upon a request sent by the host 50), or periodically (e.g., every day at 9:00 am).

As shown in FIG. 2, the time module 115 can obtain time stamps 135 stored in the file system metadata 130. As discussed above, the file system metadata 130 stores information about the files stored in the memory device 100 and can take the form of a file allocation table (e.g., FAT32), for example. When the file system metadata 130 includes time stamps 135 related to the files (e.g., a file creation time, a last access time, and a last modification time), the time module 115 can mine the time stamps 135 in the file system metadata 130 to generate a time estimate. For example, if the time module 115 knows the particular format of the file system used by the memory device 100, the time module 115 would know exactly what field to look at to capture the relevant time stamps. Alternatively, the time module 115 can search the file system metadata 130 for a particular string of characters that would be characteristic of the time stamp.

FIG. 2 also shows that, instead of or in addition to mining a time stamp from file system metadata 130, the time module 115 can mine time stamps stored in the files themselves. This embodiment takes advantage of the fact that a time stamp is often part of the content file itself and can be mined for purposes of creating a time estimate. For example, if the file contains an email message, the time stamp can be in the form of the time the email message was sent or received. As another example, if the file is a digital picture, the time stamp can be the time stamp associated with the digital picture to represent when the digital picture was supposedly taken. A file may be associated with a file type that has a known location for storing a time stamp. In such a situation, the time module 115 can first identify the file type (e.g., by analyzing the file name and/or file extension) and then retrieve the time stamp from that location. Other techniques that can be used include, but are not limited to, retrieving a time stamp from a header of a file and retrieving a time stamp from a DOCTYPE declaration in an XML file. If the file is not of a standardized types, the time module 115 can search the file for a particular string of characters that would be characteristic of the time stamp or perform more advanced file processing techniques (e.g., using optical character recognition techniques to find time information in the form of a graphic printed on an image, etc.).

In addition to obtaining time stamps from file system metadata and/or the files themselves, the time module 115 can obtain time stamp from other sources. For example, the time module 115 can obtain a time stamp from the host 50 (e.g., from the host's internal clock or from a time server in communication with the host 50) or another entity external to the memory device 100 (e.g., directly from a user via a wireless transmission to the memory device 100). Such time stamps can be sent using a protocol on top of a standard memory device protocol (e.g., the SD protocol) and can be based on reading/writing to virtual addresses in the memory 120. Preferably, if the time stamp is coming encrypted from a trusted time server, the time module 115 is first asked for a nonce (e.g., a number or bit string used only once for security purposes) in order to prevent caching of the time stamp on the host 50. In this way, the time module 115 can validate a time stamp by generating a nonce and comparing it to the nonce in an incoming message. The time module 115 can also obtain additional time stamps from other information internal to the memory device 100. For example, the time module 115 can obtain a time stamp based on an elapsed time measured by a deterioration of the memory cells in the memory 120.

As discussed above, when multiple time stamps are obtained, they can be stored in the time database 150. As some time stamps may be more reliable than others, the time module 115 preferably is implemented with the functionality to rank the various time stamps, so that the time module 115 can select time stamp(s) based on the validity rankings of the sources (act 220). That is, each time stamp can be associated with a respective source having a respective validity ranking, and the time module 115 can select one or more of the stored time stamps with which to generate a time estimate based on the validity rankings. In this way, the time module 115 can obtain time stamps from multiple sources and grade/validate the time quality from each source. The time module 115 can also invalidate time stamps in the time database 150 if more accurate timestamps are received. For example, assume that the time database 150 stores time stamps $t_1, t_2, t_3, \ldots, t_n$. Each time stamp is associated with a source that has a validity ranking. For example, a time stamp from a secure time server can be assigned the highest ranking, a time stamp from an untrusted host can be assigned the lowest rating, and a time stamp from file system metadata or the file itself can be assigned some intermediate ranking. The rankings can be updated, as appropriate. Consider, for example, the situation in which the memory device 100 is connected to a digital camera (the host 50), which stores a digital picture having the time stamp "12:00 Aug. 1, 2009." The time module 115 would store this time stamp in the time database 150. For this example, assume that the user set the camera clock incorrectly, and the time stamp is incorrect. When the memory device 100 is taken out of the camera and put in a card reader for transferring the digital picture to a PC, a time agent running in the PC can provide the memory device 100 with its own time stamp; here, "13:00 Jul. 1, 2009." This time stamp is added to the time database 150 as entry n+1. If the time agent in the PC is considered to be more reliable than the camera clock, entry n can be considered to be false, and the time module 115 can use entry n+1 as the correct time stamp with which to generate a time estimate. Instead of using one time stamp instead of another, the selected time stamp can be the average of multiple time stamps, with one or more of the individual time stamps being weighted according to its ranking. Of course, other calculations and selection techniques can be used.

Irrespective of how a time stamp is obtained, a time estimate can be generated from the time stamp using any suitable technique (act 230). For example, in one embodiment, the memory device 100 is capable of keeping track of elapsed time while it is powered-on (i.e., its "active time") and adjust the time stamp by the active time to generate a time estimate. The memory device 100 can keep track of its active time in any suitable manner. For example, the memory device 100 can contain an oscillator that generates periodic clock ticks and provides such ticks to the controller 110 as interrupts. Accordingly, the oscillator interrupts the controller 110 on a periodic basis (e.g., every millisecond or microsecond). When the controller 110 gets the interrupt, a special clock interrupt service routine (e.g., in firmware run by the controller 110) can be invoked to add one period/unit to an active time counter. To convert the value in the active time counter into real time, the controller 110 can multiply the stored value by the frequency in which the oscillator generates clock ticks. For example, if the value 500 were stored in the active time counter and the oscillator generates a clock tick every 5 milliseconds, the controller 110 would calculate an active time of 2,500 milliseconds (500 times 5). As noted above, to generate a time estimate, the time module 115 can add the translated active time to the selected time stamp(s). If the memory device 100 receives a time stamp from a trusted source, the memory device 100 can store that time stamp and reset the active time counter.

In one embodiment, when the time module 115 is asked to give a time estimate, it generates the time estimate by adjusting a selected time stamp by the memory device's active time. This result is sometimes referred to herein as "fuzzy time." As noted above, the time estimate can be a single time reading or a range of times. For example, with reference to the above illustration where the time module 115 selects the more reliable n+1 time stamp ("13:00 Jul. 1, 2009") instead of the less reliable n time stamp ("12:00 Aug. 1, 2009"), the time estimate would be the n+1 time stamp ("13:00 Jul. 1, 2009") minus the recorded elapse time between the times that the n and n+1 entries were recorded. However, the time estimate could be a range to account from both of those time stamps in a weighted or un-weighted fashion. For example, using both time stamps in an un-weighted fashion, the time estimate can be a range of times between "13:00 Jul. 1, 2009" (as adjusted by the active time) and "12:00 Aug. 1, 2009" (as adjusted by the active time).

Irrespective of how the time estimate is generated, the time module 115 can use the time estimate to perform a time-based activity (act 240). As used herein, the phrase "time-based activity" refers to any activity performed by the memory device 100 whose performance is triggered by time or that uses time in the performance of the activity. A time-based activity can be used to improve memory device operation and offer new functionality to applications 140 on the memory device 100, as well as requests from the applications 140 for time information. For example, the time-based activity can be a time-based scheduling of a memory device management activity. In this way, tasks routinely performed by the memory device 100 (e.g., garbage collection or other maintenance/repair flash management operations) can be scheduled at a convenient time (e.g., during night hours), at a particular day of the week (e.g., weekends) or date (e.g., once every month), or at a time that the memory device 100 chooses after studying usage patterns (e.g., in the morning for users who use the memory device 100 at night). Also, instead of using the time estimate to perform a memory device management task, the time module 115 can use the time estimate to trigger a request to the host 50 for a time alert for scheduling a memory device management task. For example, the memory device 100 can be programmed to ask the host 50 to initiate a defrag operation on the memory device 100 every six months, so that the host 50 does not have to check the memory device 100 to see when the last time a defrag operation was preformed. When the appropriate time comes, the memory device 100 will alert the host 50.

It should be noted that a scheduled activity does not necessarily need to relate to a management activity of the memory device 100. For example, the activity can be a time-based advertisement (e.g., displaying a chocolate advertisement before Valentine's Day, playing an advertisement for a movie three weeks before the movie's release date and stopping the advertisement three weeks after the release date, etc.) or service (e.g., a limited-time trial demo of an application) issued by an application 140 on the memory device 100. Again, since the time estimate for these activities is coming from the memory device 100 itself, these activities do not necessarily require a specific time agent on the host 50.

Other time-based activities can be used. For example, another time-based activity could be the monitoring of content license expiration. When content is protected by digital rights management (DRM), the content is often associated with a content license that specifies the conditions under which the content can be accessed. If one of those conditions is time, the time estimate can be used to validate the license.

As another example, the time-based activity can be time stamping a file stored in the memory device 100, such that a time estimate can be attached to a file that is not dated. This can be done, for example, by attaching the time estimate to an undated file, by attaching the time estimate to file system metadata of an undated file, or by keeping the time estimate in a separate table. It may be preferred to attach the time estimate to the file itself, so that the time estimate will be kept together with the file even if the file is copied from the memory device 100. This allows the memory device 100 to provide new services, such as tamper-proof time stamping (i.e., files can be dated precisely even when running on a malicious host or when the host 50 generates a false time stamp or no time stamp because the host's clock was not set correctly or was not set at all) and automatic versioning of files (i.e., the memory device 100 can keep track of file versioning, letting the application 140 restore any historic revision of the file). Such tamper-proof time stamping can be useful in user applications, such as a modification-proof audio/video recorder that can used to provide proof in a legal proceeding.

As yet another example, the time-based activity can be to invalid a previously-recorded time stamp in view of a more-accurate time stamp (e.g., a time stamp received from a more reliable source). In this way, the time module 115 can "fix time." For example, consider the situation in which the best time stamp currently stored in the memory device 100 indicates that the date is June $1^{st}$. If the memory device 100 later generates a new, more reliable time estimate of May $15^{th}$, the time module 115 can fix older records stored in the memory device 100. For example, if the memory device 100 stores a dated digital picture, as in the above example, the time module 115 can change the date attached to the stored digital picture.

In addition to providing a time estimate to an application 140 inside the memory device 100, the time-based activity may be performed using an application program interface (API) to provide a time estimate to the host 50. For example, the memory device 100 can store a time estimate as text in a special file in the memory device 100, and the host 50 can access the file in order to get the memory device's latest time estimate.

There are many advantages associated with the above embodiments. First, as can be seen from these examples, the "time aware" memory device 100 in these embodiments does not need to rely upon on a specific host, a specific host application, or a specific file type to generate a time estimate, and the time-based activity is not limited to a single application (e.g., DRM license validation). This provide flexibility to use the time module 115 with new services and applications that are later added to the memory device 100. Also, when time stamps come from different sources, the time module 115 can evaluate the reliability of each source and changes time estimates (e.g., based on time stamps, time reading history, and time source reliability). This provides a robust time system on the memory device 100. Further, because the time module 115 can invalid old time estimates, the time module 115 has the flexibility of correcting previous time estimate associated with files if a more reliable time stamp reveals that a previous time estimate was inaccurate. In addition, these embodiment provide file system integration in that the memory device 100 can offer file services, such as versioning, backup/restore, and logging even if the host file system does not provide these services. Further, since the memory device 100 itself provides these services, these services can be available when the memory device 100 is used with any of a variety of hosts.

Figure 3:
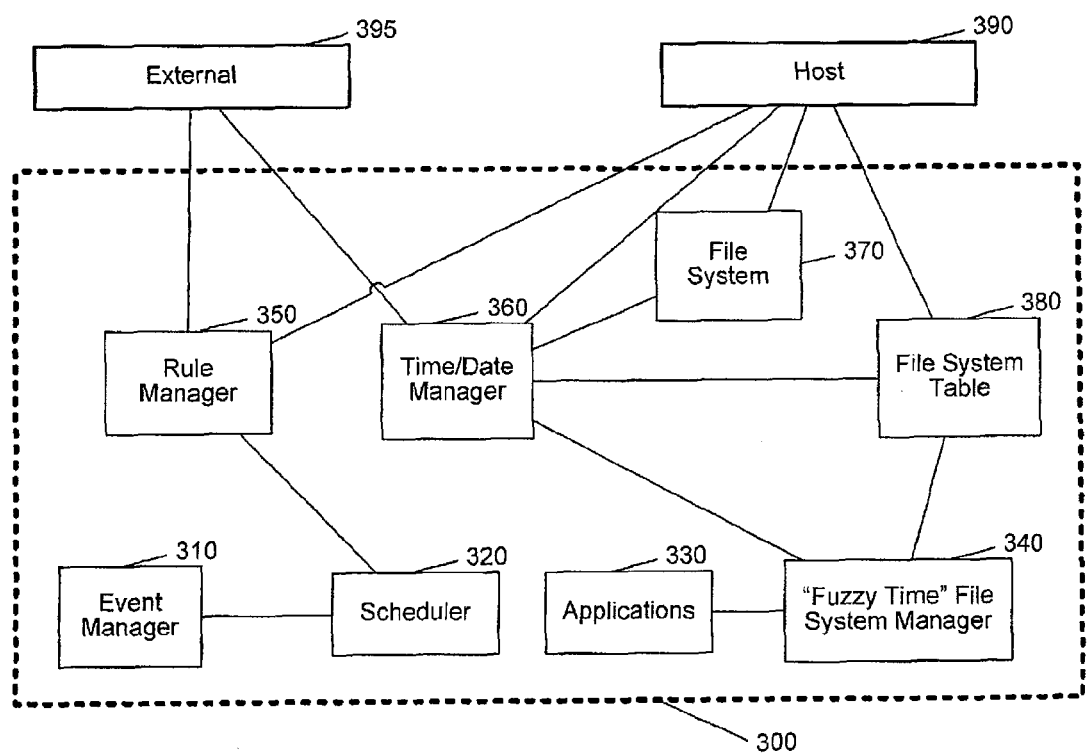
FIG. 3 is a block diagram of a memory device of an embodiment.

Returning to the drawings, FIG. 3 is a block diagram of a memory device 300 that illustrates various functional blocks that can be implemented by the time module. This figure pulls together several of the various embodiments discussed above for illustration purposes. However, it should again be noted that any of these various features can be used alone or together in combination. As shown in FIG. 3, the memory device 300 of this embodiment comprises an event manager 310, a scheduler 320, a set of applications 330, a "fuzzy time" file system manager 340, a rule manager 350, a time/date manager 360, a file system 370 which stored files, and a file system table 380 which stored metadata and other data structures for managing files in the file system 370. The memory device 300 has the appropriate interfaces to be placed in communication with a host 390 and/or some other external entity 395. The external entity 395 can be any entity that can communicate directly with the memory device 300 bypassing the host 390. The external entity 395 can be, for example, a user or a computing platform that has direct interface to the card (e.g., through a wireless connection).

In operation, the time/date manager 360 collects time stamps from one or more sources internal to the memory device 300, as described above. For example, the time/date manager 360 can collect a time stamp from the file system table 380 or from the files stored in the file system 370. The host 390 or external entity 395 can also provide the time/date manager 360 with a time stamp. For example, the host 390 can fetch a time stamp from its own internal clock or from a time server on the network. Instead of a time stamp being pushed to the memory device 300, the time/date manager 360 can request a time stamp from the host 390 or external entity 395. For example, the time/date manager 360 can send a request for the current local time, a request for the current GMT time, or a request for an alert at a specific time (e.g., in 10 hours, every first of the month at noon, etc.)

The time/date manager 360 can evaluate the time stamps from a variety of sources and evaluates the accuracy and the reliability of each time source and generate a time estimate to keep a "fuzzy" clock, as described above. This time estimate is used in a time-based activity in the memory device 300. For example, the rule manager 350, event manager 310, and scheduler 320 can be used to schedule and perform a time-based activity. The rule manager 350 keeps time-based rules (e.g., "run garbage collection every night at 3 AM"), which can be predefined or based on event history. For example, if the rule manager 350 notices that the memory device 300 is not active during night time, it can schedule maintenance tasks during these hours. Rules can be preloaded in the memory device 300 and/or the host 390 or external entity 395 can provide rules to the memory device 300. The event manager 310 monitors memory device events, such as garbage collection, memory capacity exceeding a predefined threshold, formatting, and power on/off. The scheduler 320 schedules memory device management and other tasks based on rules and events. In this way, the memory device 300 can perform scheduled time-based activities. This overall operation is illustrated in the flow chart 400 in FIG. 4. When an event occurs in the memory device 300 (act 410), the event manager 310 records the event (act 420), and when a rule is entered by the host 390 or by the external entity 395 (act 430), it is recorded by the rule manager 350 (act 440). Based on the recorded event and the recorded rule, the scheduler 320 schedules a management task (act 450).

The applications 330 (e.g., caplets) can also perform time-based activities by asking the time/date manager 360 for a time estimate. For example, an on-card music application can ask the time/date manager 360 for a time estimate, so that it can record the last time a particular mp3 file was played. Also, the "fuzzy time" file system manager 340 can attach a time estimate to a file stored in the file system 370 or to file system metadata, as discussed above, to provide a time stamping function. This overall operation is illustrated in the flow chart 500 in FIG. 5. When a file is modified on the memory device 300 (act 510), the "fuzzy time" file system manager 340 is notified (act 520). Then, when an application accesses a file on the memory device 300 (act 530), the application asks the "fuzzy time" file system manager 340 for time attributes, such as last access time and creation time (act 540).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for generating a time estimate in a memory device, the method comprising:
performing by a processor in a memory device embedded in a host:
storing in the memory device: (i) a plurality of files and (ii) file system metadata for each of the plurality of files, wherein file system metadata for a given file contains a time stamp associated with that file;
generating an estimate of what time it is from the time stamps in the file system metadata for the plurality of files, wherein the memory device does not have a real-time clock; and
using the estimate of what time it is to perform a time-based activity in the memory device.

2. The method of claim 1, wherein the time-based activity comprises sending a request to the host for scheduling a memory device management task.

3. The method of claim 1, wherein the file system metadata comprises an entry in a file allocation table.

4. The method of claim 1, wherein the time stamp comprises one or more of the following:
a file creation time, a last access time, and a last modification time.

5. The method of claim 1, wherein the time-based activity comprises one or more of the following:
time-based scheduling of a service, time-based scheduling of a memory device management activity, monitoring of content license expiration, time-based advertising, and time stamping a file stored in the memory device.

6. The method of claim 1, wherein the time-based activity comprises attaching the estimate of what time it is to an undated file.

7. The method of claim 1, wherein the time-based activity comprises attaching the estimate of what time it is to file system metadata of an undated file.

8. The method of claim 1, wherein the time-based activity comprises invaliding a previously-recorded time stamp in view of a more-accurate time stamp.

9. The method of claim 1, wherein the time-based activity comprises providing the estimate of what time it is to the host.

10. The method of claim 1, wherein the estimate of what time it is comprises a time interval.

11. The method of claim 1 further comprising receiving a rule to perform a time-based activity in the memory device.

12. The method of claim 11 further comprising monitoring a memory device event and scheduling the time-based activity based on the rule and monitored event.

13. The method of claim 1 further comprising receiving a time stamp from an entity external to the memory device and generating the estimate of what time it is using both the time stamp received from the entity and the time stamps in the file system metadata for the plurality of files.

14. The method of claim 1 further comprising tracking an active time of the memory device, and wherein the estimate of what time it is generated by adjusting the time stamps by the active time.

15. A method for generating a time estimate in a memory device, the method comprising:
performing by a processor in a memory device embedded in a host:
storing a plurality of files in the memory device, wherein each of the plurality of files stores a respective time stamp;
generating an estimate of what time it is from the time stamps stored in the plurality of files, wherein the memory device does not have a real-time clock; and
using the estimate of what time it is to perform a time-based activity in the memory device.

16. The method of claim 15, wherein the time-based activity comprises sending a request to the host for scheduling a memory device management task.

17. The method of claim 15, wherein one of the plurality of files contains an email message, and wherein the time stamp is a time the email message was sent or received.

18. The method of claim 15, wherein one of the plurality of files contains a digital picture, and wherein the time stamp is a time the digital picture was taken.

19. The method of claim 15, wherein the time-based activity comprises one or more of the following:
time-based scheduling of a service, time-based scheduling of a memory device management activity, monitoring of content license expiration, time-based advertising, and time-stamping a file stored in the memory device.

20. The method of claim 15 further comprising receiving a rule to perform a time-based activity in the memory device.

21. The method of claim 20 further comprising monitoring a memory device event and scheduling the time-based activity based on the rule and monitored event.

22. The method of claim 15 further comprising receiving a time stamp from an entity external to the memory device and generating the estimate of what time it is using both the time stamp received from the entity and the time stamps stored in the plurality of files.

23. The method of claim 15, wherein the time-based activity comprises attaching the estimate of what time it is to an undated file.

24. The method of claim 15, wherein the time-based activity comprises attaching the estimate of what time it is to file system metadata of an undated file.

25. The method of claim 15, wherein the time-based activity comprises invaliding a previously-recorded time stamp in view of a more-accurate time stamp.

26. The method of claim 15, wherein the time-based activity comprises providing the estimate of what time it is to the host.

27. The method of claim 15, wherein the estimate of what time it is comprises a time interval.

28. The method of claim 15 further comprising tracking an active time of the memory device, and wherein the estimate of what time it is generated by adjusting the time stamps by the active time.

29. A method for generating a time estimate in a memory device, the method comprising:
performing by a processor in a memory device embedded in a host:
obtaining a plurality of time stamps, each time stamp being associated with a respective source having a respective validity ranking;
selecting one or more of the plurality of time stamps based on the validity rankings;
generating an estimate of what time it is from the selected time stamp(s), wherein the memory device does not have a real-time clock; and
using the estimate of what time it is to perform a time-based activity in the memory device.

30. The method of claim 29, wherein the time-based activity comprises sending a request to the host for scheduling a memory device management task.

31. The method of claim 29, wherein a time stamp is obtained for one or more of the following:
   file system metadata stored in the memory device, a file stored in the memory device, an entity external to the memory device, a host agent on a host in communication with the memory device, a time server in communication with the memory device, a second estimate of what time it is generated by the memory device, and an elapsed time measured by a deterioration of memory cells in the memory device.

32. The method of claim 29, wherein the time-based activity comprises one or more of the following:
   time-based scheduling of a service, time-based scheduling of a memory device management activity, monitoring of content license expiration, time-based advertising, and time stamping a file stored in the memory device.

33. The method of claim 29 further comprising receiving a rule to perform a time-based activity in the memory device.

34. The method of claim 33 further comprising monitoring a memory device event and scheduling the time-based activity based on the rule and monitored event.

35. The method of claim 29, wherein the time-based activity comprises attaching the estimate of what time it is to an undated file.

36. The method of claim 29, wherein the time-based activity comprises attaching the estimate of what time it is to file system metadata of an undated file.

37. The method of claim 29, wherein the time-based activity comprises invaliding a previously-recorded time stamp in view of a more-accurate time stamp.

38. The method of claim 29, wherein the time-based activity comprises providing the estimate of what time it is to the host.

39. The method of claim 29, wherein the estimate of what time it is comprises a time interval.

40. The method of claim 29 further comprising tracking an active time of the memory device, and wherein the estimate of what time it is generated by adjusting the selected time stamp(s) by the active time.

41. The method of claim 29, wherein a validity ranking of a source is determined by the source's time quality.

42. A memory device comprising:
   a memory configured to store a plurality of files and file system metadata for each of the plurality of files, wherein each file comprises a respective time stamp, and wherein file system metadata for a given file contains a time stamp associated with that file; and a controller in communication with the memory and operative to perform the following:
      generate an estimate of what time it is from one or both of the time stamps in the file system metadata for the plurality of files and the time stamps stored in the plurality of files, wherein the memory device does not have a real-time clock, and wherein the memory device is embedded in a host; and
      use the estimate of what time it is to perform a time-based activity in the memory device.

43. The memory device of claim 40, wherein the time-based activity comprises sending a request to the host for scheduling a memory device management task.

44. The memory device of claim 42, wherein the file system metadata comprises an entry in a file allocation table.

45. The memory device of claim 42, wherein the time stamp in the file system metadata comprises one or more of the following: a file creation time, a last access time, and a last modification time.

46. The memory device of claim 42, wherein the time-based activity comprises one or more of the following:
   time-based scheduling of a service, time-based scheduling of a memory device management activity, monitoring of content license expiration, time-based advertising, and time stamping a file stored in the memory device.

47. The memory device of claim 42, wherein the time-based activity comprises attaching the estimate of what time it is to an undated file.

48. The memory device of claim 42, wherein the time-based activity comprises attaching the estimate of what time it is to file system metadata of an undated file.

49. The memory device of claim 42, wherein the time-based activity comprises invaliding a previously-recorded time stamp in view of a more-accurate time stamp.

50. The memory device of claim 42, wherein the time-based activity comprises providing the estimate of what time it is to the host.

51. The memory device of claim 42, wherein the estimate of what time it is comprises a time interval.

52. The memory device of claim 42, wherein the controller is further operative to receive a rule to perform a time-based activity in the memory device.

53. The memory device of claim 52, wherein the controller is further operative to monitor a memory device event and schedule the time-based activity based on the rule and monitored event.

54. The memory device of claim 42, wherein the controller is further operative to receive a time stamp from an entity external to the memory device and generate the estimate of what time it is using both the time stamp received from the entity and the one or both of the time stamps in the file system metadata for the plurality of files and the time stamps stored in the plurality of files.

55. The memory device of claim 42, wherein the controller is further operative to track an active time of the memory device, and wherein the estimate of what time it is is generated by adjusting the time stamps by the active time.

56. The memory device of claim 42, wherein each time stamp source has a validity ranking, and wherein the controller is further operative to select one or more of a plurality of time stamps based on the validity rankings, wherein the estimate of what time it is generated from the selected time stamp(s).

* * * * *

UNITED STATES PATENT AND TRADEMARK OFFICE
CERTIFICATE OF CORRECTION

PATENT NO. : 8,751,855 B2
APPLICATION NO. : 13/862978
DATED : June 10, 2014
INVENTOR(S) : Rahav Yairi et al.

It is certified that error appears in the above-identified patent and that said Letters Patent is hereby corrected as shown below:

In the Claims

In column 9, claim 14, line 62, before "generated by adjusting" replace "time it is" with --time it is is--.

In column 10, claim 28, line 52, before "generated by adjusting" replace "time it is" with --time it is is--.

In column 11, claim 40, line 41, before "generated by adjusting" replace "time it is" with --time it is is--.

In column 12, claim 56, line 55, before "generated from the selected" replace "time it is" with --time it is is--.

Signed and Sealed this
Thirtieth Day of September, 2014

Michelle K. Lee
*Deputy Director of the United States Patent and Trademark Office*